UNITED STATES PATENT OFFICE.

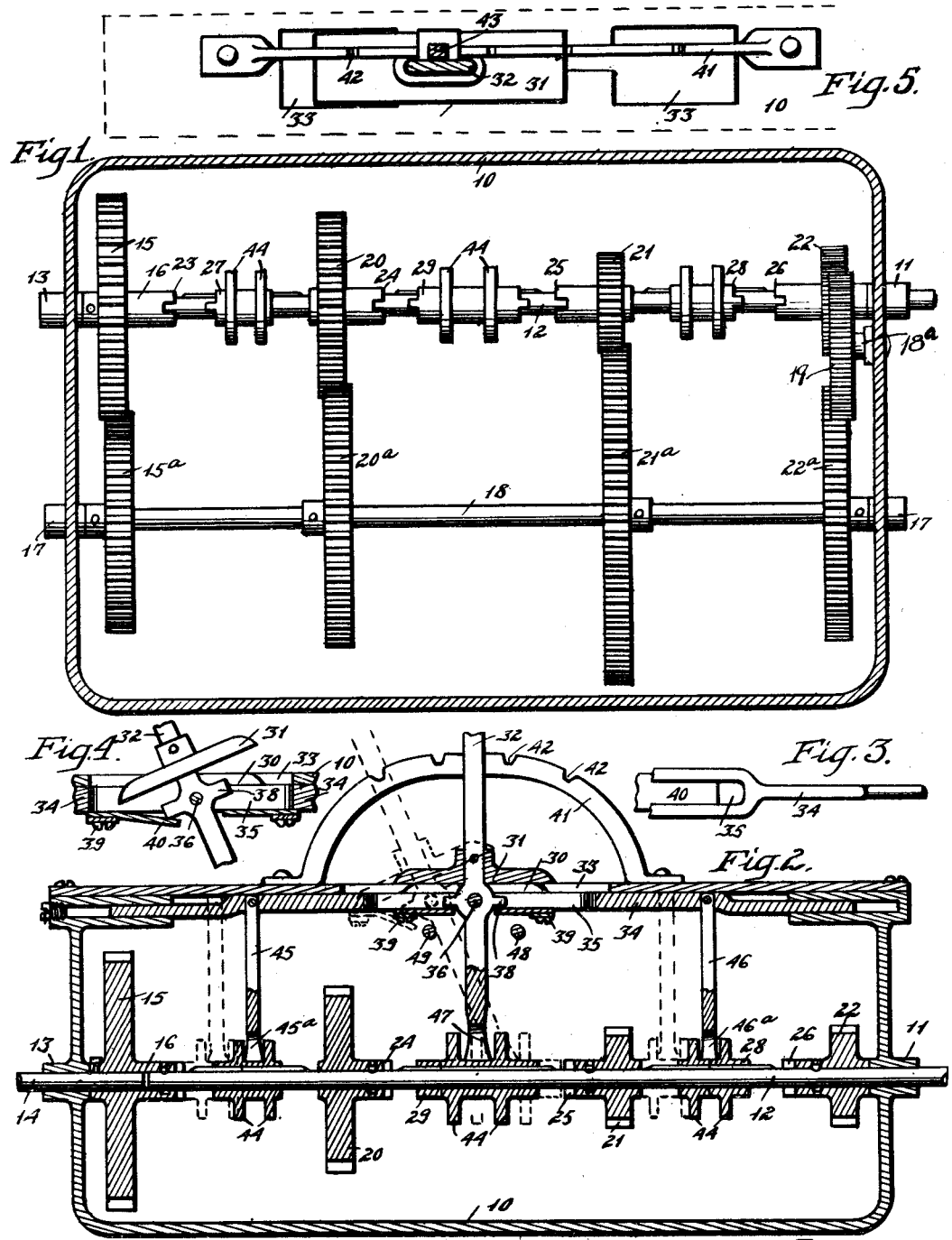

GEORGE A. McCLEEARY, OF VAN METER, IOWA.

VARIABLE-SPEED GEARING.

1,051,343.   Specification of Letters Patent.   Patented Jan. 21, 1913.

Application filed November 27, 1911. Serial No. 662,672.

*To all whom it may concern:*

Be it known that I, GEORGE A. MCCLEEARY, a citizen of the United States, residing at Van Meter, in the county of Dallas and State of Iowa, have invented a new and useful Variable-Speed Gearing, of which the following is a specification.

The object of my invention is to provide a variable speed gearing for power driven vehicles, of simple, durable and inexpensive construction, whereby speed may be transmitted from a power shaft and whereby four variations in the relative speed of the shafts may be effected by the operation of a single lever.

A further object is to provide a counter shaft on which are gears of different sizes and a power shaft on which are gears of different sizes, and to provide a means whereby the operation of a single lever will cause the various gears on the power shaft to become operatively connected with and thereby rotate the counter shaft in such a way as to cause the counter shaft to rotate at "low", "intermediate", "high" or "reverse" speed with relation to the power shaft.

A further object is to provide a counter shaft on which are fixed gears of different sizes and a power shaft on which are gears of various sizes rotatably but non-slidably mounted. On the last named gears are formed clutch members. Coacting clutch members are feathered to said power shaft and are capable of longitudinal movement thereon. A slide bar operates a part of said last described clutch members and a single lever is arranged to operate said slide bar and the rest of said clutch members.

My invention consists in certain details, in the construction, arrangement and combination of the various parts of the device, whereby the objects contemplated are attained, as hereinafter more fully set forth, pointed out in my claims, and illustrated in the accompanying drawings, in which—

Figure 1 shows a top or plan view of the shafts of my improved variable speed gearing with the gears thereon. Fig. 2 shows a longitudinal, vertical, sectional view on the line of the power shaft, of my improved variable speed gearing. Fig. 3 shows a detail view of part of the slide bar showing the slot therein. Fig. 4 shows a detail view partly in section of the lever at the extreme limit of its movement. Fig. 5 shows a top or plan view of the slide bar and lever partly in section.

In the accompanying drawing, I have used the reference numeral 10 to indicate a gear casing, which may be of any suitable construction. Extending through one end of the gear casing, and rotatably mounted in the bearing 11, is an engine or power shaft 12. Rotatably mounted in the bearing 13 is a driven shaft 14 which extends into the interior of the gear casing 10 in line with the shaft 12. Fixed on the shaft 14 is a gear wheel 15 which is provided with an elongated hub 16 in which is rotatably mounted the inner end of the power shaft 12 as clearly shown in Fig. 2. Extending through the casing 10 and rotatably mounted in the bearings 17, is a counter shaft 18 parallel with the shaft 12. On the shaft 12, are loosely mounted gears 20, 21 and 22. The gears 15, 20 and 21 are in mesh with gears 15$^a$, 20$^a$ and 21$^a$, fixed on the countershaft 18. The gear 22 is in mesh with an intermediate gear 19 mounted on the idler shaft 18$^a$.

The gears 20, 21 and 22 are rotatably mounted on the shaft 12 but are fixed against longitudinal movement thereon and the gear 15 is fixed on the shaft 14. Formed on the hubs of the gears 15, 20, 21 and 22 are clutch members 23, 24, 25 and 26. Feathered to the shaft 12 and capable of longitudinal movement thereon are the clutch members 27 and 28 and the double clutch member 29. The clutch member 27 is designed in one position of its movement on the shaft 12 to engage the clutch member 23, thereby causing the gear 15 and the shaft 14 to rotate with the shaft 12. The clutch member 28 is designed in one position of its longitudinal movement on the shaft 12 to engage the clutch member 26 and to cause the gear 22 to rotate with the shaft 12. The clutch member 29 is designed in one position of its movement to engage the clutch member 24 and to cause the gear 20 to rotate with the shaft 12, and in another position of its longitudinal movement on the shaft 12 to engage the clutch member 25 and to cause the gear 21 to rotate with said shaft, while in still another position of its movement, the clutch member 29 is in engagement with neither of the clutch members 24 or 25. The gears heretofore described, are of such relative sizes that when the shaft 12 is operated and the clutch members 27 and 23 are moved together the driven shaft 14 will be rotated at "high" speed. When the clutch members 24 and 29 are moved into engagement, the clutch members 27 and 23 are at the same time moved out of engagement and the driven shaft is rotated at so-called intermediate speed. When the clutch members 28 and 26 are moved together the driven shaft is operated at reverse speed.

For operating the clutch members 27, 28 and 29, I have provided the following mechanism: In the casing 10, preferably in the upper side thereof, is a longitudinal slot 30. Vertically mounted in said slot is a lever 32. Mounted on the lever 32 and designed to slide on the case 10 above the slot 30 is a block 31. The slot 30 is provided with lateral extensions 33 at its end, of sufficient width to receive the block 31. Slidably mounted below the slot 30 adjacent to the casing 10, is a slide bar 34 in which is a central, longitudinal slot 35. The controlling lever 32 is pivotally mounted by means of the bolt 36 in the slot 35 in the slide bar 34. The slot 35 is of sufficient width to receive the block 31 when the handle 32 is moved to the position shown in Fig. 4 and by the dotted lines in Fig. 2. Adjacent to the bolt 36, the lever 32 is provided with opposite lateral extensions 38 extending longitudinally of the slide bar 34. Secured to the lower side of the slide bar 34 on each side of the controlling lever 32 by means of screws 39 or other suitable means, are flat springs 40, the free ends of which are adjacent to the respective sides of the lever 32 and below the extensions 38 thereon. The function of said springs will be hereinafter more fully set forth. Above the casing 10 is a sector 41 in which are notches 42 designed to be engaged by a dog 43 on the lever 32, whereby the lever 32 is locked in various positions of its movement.

On each of the clutch members 27, 28 and 29, are parallel annular flanges 44. Secured to the slide bar 34 are rigid downwardly extending arms 45 and 46, the lower ends of which are provided with forks 45ª and 46ª which receive the portions of the clutch members 27 and 28 between the flanges 44 thereon, as shown in Fig. 2. It will be readily seen that longitudinal movement of the slide bar 34 will through the arms 45 and 46 move the clutch members 27 and 28 longitudinally on the shaft 12 and move them into or out of engagement with the clutch members 23 and 26. On the lower end of the controlling lever 32 is a fork 47 which straddles the portion of the clutch member 29 between the flanges 44 thereon as shown in Fig. 2. By means of the movement of the lever 32, the clutch member 29 may be moved in either direction on the shaft 12 and may be thrown into engagement with the clutch member 24 or the clutch member 25.

Having described the parts of my improved variable speed gearing, and their relations to each other, I will now explain how the clutch members 27, 28 and 29 are operated by the lever 32 to produce the four speeds hereinbefore referred to. Assuming that the shaft 12 is rotated by means of power from the engine and that the lever 32 is in vertical position, then the clutch member 29 will be midway between the clutch members 24 and 25 and the clutch members 27 and 28 will be in positions where they do not engage the clutch members 23 and 26. Since the gears 20, 21 and 22 are loosely mounted on the shaft 12, and the gear 15 on the shaft 14 rotates freely with relation to said shaft 12, no motion will be imparted to the shaft 18. If it is desired to cause the shaft 14 to rotate at "low" speed, the lever 32 is pushed toward the right side of the view shown in Fig. 2. The clutch member 29 will be moved to position in engagement with the clutch member 25. The shaft 14 will then be rotated with the shaft 12 as hereinbefore described and will in turn rotate the gear 21ª and the shaft 18. The movement of the lever just referred to will have moved the slide bar slightly but the location of the arm 46 is such that the clutch member 28 will not have engaged the clutch member 26.

In order to cause the clutch member 28 to engage the clutch member 26, I have secured in the casing 10, a transverse rod 48 extending across the interior of the casing 10 just below the spring 40 on the right side of the lever 32, as shown in Fig. 2, and so located that when the lever 32 is moved to position where the clutch member 29 engages the clutch member 25, the lever 32 is in engagement with, or almost in engagement with said rod 48. When the upper end of the lever 32 is moved farther to the right, the lower end of said lever will engage the rod 48, the clutch member 29 will be moved out of engagement with the clutch member 25 and the slide bar will be moved farther to the right so that the arm 46 moves the clutch member 28 into engagement with the clutch member 26. The gear 22 will be caused to rotate with a shaft 12 and through the intermediate gear 19 will cause the rotation of the wheel 22ª and the shaft 18 at "reverse" speed. When the lever 32 is moved in the other direction, to position where the clutch member 29 engages the clutch member 24, "intermediate" speed of the shaft 14 is produced, as before described. The arm 45 is so located on the slide bar 34 that when the clutch member 29 is in engagement with the clutch member 24, the clutch member 27 will still be slightly spaced apart from the clutch member 23. Located on the left side of the lever 32 is a transverse rod 49 similar to the rod 48 located at such a point that it is adjacent to the lever 32 when said lever is moved to the left to proper position for securing "intermediate" speed, as above set forth. When the lever 32 is then moved farther to the left, as shown in Fig. 4, and by the dotted lines in Fig. 2, the clutch member 29 will be moved out of engagement with the clutch member 24, the slide bar will be moved farther to the left, and through the arm 45 will move the clutch member 27 into engagement with the clutch member 23 producing "high" speed.

The purpose of the extensions 38 and the spring 40 will now be explained. When the lever 32 is grasped by the handle at its upper end, and the block 31 is slid longitudinally on the casing 10, there is a tendency for said block to bind. The springs 40 are located in position to engage the extensions 38 and to prevent the tendency of the block 31 to bind on the casing 10. When the lever 32 is moved to one of the extreme limits of its movement, as shown by the dotted lines in Fig. 2, one of the extensions 38 engages the adjacent spring 40 and presses the end of said spring downwardly. The pressure of said spring assists the operator in returning the lever toward its vertical or neutral position.

It will be seen that by means of the construction hereinbefore set forth, I am able to produce "high," "low," and "reverse" and "intermediate" speeds by the operation of a single controlling lever. The advantages of such a device are obvious.

I claim as my invention:

1. In a device of the class described, a suitable support, a power shaft mounted therein, a driven shaft in line with said power shaft, a counter shaft rotatably mounted parallel to said power shaft, three gears rotatably but non-slidably mounted on said power shaft, a gear fixed on said driven shaft, adjacent to the end of said power shaft, each of said gears having a clutch member formed thereon, three counter gears fixed on said counter shaft in mesh respectively with two of the gears on the power shaft, and with the gear on said driven shaft, an idler shaft, a gear thereon in mesh with the other gear on said power shaft, a gear fixed on said counter shaft in mesh with the gear on said idler shaft, clutch members slidably but non-rotatably mounted on said power shaft, and means whereby said clutch members may be moved longitudinally on the power shaft to throw any one of them into engagement with the corresponding clutch member on one of said first described gears, without at the same time moving any of the other clutch members into engagement, said means being controlled by a single lever, said means comprising a slide bar mounted on said support, rigid arms mounted on said slide bar and operatively connected respectively with two of said slidable clutch members, said lever being operatively connected with two other of said slidable clutch members, transverse rods mounted in said casing for limiting the movement of said lever and said slide bar.

2. In a device of the class described, a support, a power shaft mounted therein, a driven shaft mounted in line with said power shaft, three gears rotatably but non-slidably mounted on said power shaft, a gear fixed on said driven shaft, said gears having clutch members formed thereon, a double-faced clutch member slidably but non-rotatably mounted on said power shaft between the two middle gears, clutch members slidably but non-rotatably mounted on said power shaft and designed to coact respectively with the clutch members on the two outer gears above described, a slide bar mounted on said support, a lever pivoted thereon and operatively connected with said double-faced clutch member, rigid arms mounted on said slide bar and operatively connected respectively with the other clutch members on said power shaft, limiting means on each side of said lever below said slide bar for limiting the movement of said lever, and means for locking said lever in various positions of its movement, a counter shaft rotatably mounted in said support, three gears thereon, in mesh respectively with the gear on said driven shaft and with two of the gears on said power shaft, a fourth gear fixed on said counter shaft, an idler shaft and a gear thereon in mesh with the fourth gear on said counter shaft and with the remaining gear on said power shaft.

Des Moines, Iowa, Oct. 26, 1911.

GEORGE A. McCLEEARY.

Witnesses:
A. L. HUSTON,
S. S. HOWELL.

---

Copies of this patent may be obtained for five cents each, by addressing the "Commissioner of Patents, Washington, D. C."